(12) United States Patent
Kim et al.

(10) Patent No.: US 7,037,454 B2
(45) Date of Patent: May 2, 2006

(54) COMPOSITIONS FOR A DISPOSABLE FOOD CONTAINER USING FLOUR

(76) Inventors: Youngsik Kim, 886-3, Sinjeong5-dong, Yangchun-gu, Seoul (KR) 158-856; Young Choi, 804-506, Shinwondang Apt., Seonng2-dong, Deogyang-gu, Goyang-si, Gyeonggi-do (KR) 412-714

( * ) Notice: Subject to any disclaimer, the term of this patent is extended or adjusted under 35 U.S.C. 154(b) by 0 days.

(21) Appl. No.: 10/498,011

(22) PCT Filed: Dec. 18, 2002

(86) PCT No.: PCT/KR02/02379

§ 371 (c)(1),
(2), (4) Date: Jun. 15, 2004

(87) PCT Pub. No.: WO03/051738

PCT Pub. Date: Jun. 26, 2003

(65) Prior Publication Data

US 2005/0146082 A1    Jul. 7, 2005

(30) Foreign Application Priority Data

Dec. 19, 2001  (KR) ...................... 10-2001-0081353
Dec. 19, 2001  (KR) ...................... 10-2001-0081354

(51) Int. Cl.
*B29C 65/00*    (2006.01)
*B29C 59/00*    (2006.01)

(52) U.S. Cl. .......................... 264/48; 264/41; 264/109; 264/122; 264/129

(58) Field of Classification Search ........ 264/109–128, 264/48, 41, 129
See application file for complete search history.

(56) References Cited

U.S. PATENT DOCUMENTS 5,591,491 A  *  1/1997  Ando et al. .................. 427/544

* cited by examiner

*Primary Examiner*—Stephen J. Lechert, Jr.
(74) *Attorney, Agent, or Firm*—Bacon & Thomas, PLLC

(57) ABSTRACT

The present invention uses natural materials to manufacture disposable containers, so that the present invention has no problem of environment hormone and the like as well as does no harm to human bodies unlike polystyrene-based disposable containers. Further, the present invention foams natural materials to fabricate disposable containers, so as to solve the weakness of conventional natural material-based disposable containers, that is, the problems of fragility or deformation and weight, to thereby provide economic and environment-friendly disposable containers which are light-weighted but less damaged or deformed.

6 Claims, No Drawings

COMPOSITIONS FOR A DISPOSABLE FOOD CONTAINER USING FLOUR

TECHNICAL FIELD

The present invention relates to a method for manufacturing a disposable container using natural materials such as flour and the like.

BACKGROUND ART

Most disposable containers being widely used currently are ones formed by foaming and compression-molding synthetic resin such as polystyrene or the like, and ones formed by jetting synthetic resin on the surface of paper which is a primary material.

It is a trend that the use amount of disposable containers increases every year with more fast food consumed in food-related life style amongst our contemporaries. However, foamed polystyrene containers contain chemicals harmful to human bodies like producing environmental hormones and so on, and the problem of disposing of the used containers is growing more serious according to the increase of the use amount of the containers.

Accordingly, in recent, researches and developments are actively ongoing that replace the polystyrene with natural polymer materials which can be obtained from grain starch or wheat flour, grain skins, and so on. As examples using grain powder, there exists a method molding, freezing, and coating dough obtained from mixing wheat flour, starch, sodium bicarbonate, and salt (Republic of Korea Patent No. 96-0006565), a method aging, extruding, molding, and freeze-drying dough obtained from mixing purified water of proper temperature with grain starch and wheat flour as primary materials and sugar, spices, yeast, and so on supplementary materials(Republic of Korea Patent No.99-0047173), and the like. Further, as illustrations using grain skins, there exists a method mixing ground skins of rice, barley, foxtail millet, Indian millet and so on, water, and starch, molding, and then coating for rinal products(Republic of Korea Patent No. 99-0055567), and a method wherein plant particles as a basic material are obtained from grinding corn stalks or various grain skin, mixed with edible gelatin, compressed through a molder for final products(Republic of Korea Patent No. 99-0037967), and so on.

However, such products are so heavy, fragile, and shrunk due to ambient temperatures that lots of limitations are applied in use as primary materials in order to solve the problems, indecomposable additives are inevitably used in many occasion. Therefore, there still exists decomposability problems as well as difficulties in practical usage due to high prices.

DISCLOSURE OF INVENTION

It is an Object of the present invention to provide a method for manufacturing disposable containers based on natural materials which can replace polystyrene causing environment pollution and harmful to human bodies.

It is another object of the present invention to provide method for manufacturing disposable containers which are relatively inexpensive, light-weighted, less fragile, and less deformed.

In order to achieve the above objects, flour, tapioca powder and/or funori(seaweed extract) was used as a primary material for disposable containers according to the present invention instead of polystyrene, and alum and Sodium bicarbonate were used as supplementary materials, and pulp or cotton fiber was used as a binder. Sodium bicarbonate was used as a foam agent, and glycerine was added for product flexibility.

According to the present invention, flour, tapioca powder and/or funori as primary material(A) was mixed with pulp or cotton fiber as a binder(B) in a ratio of 3–7:7–3 by weight %. A ratio of the mixture of flour, tapioca powder, and/or funori to the binder is preferably 7:3. There occurs drawbacks in that a high binder ratio causes difficulties in foam-molding products, product to hard, and a low binder ratio causes fragile products of low strength. In addition sodium bicarbonate, alum and glycerine are mixed with the mixture(A+B) by 1~2 weight %, respectively, with respect to 100 weight % of the mixture(A+B).

As below is a method for manufacturing disposable containers with the above materials according to the present invention.

Flour, tapioca powder or funori, or a mixture of two or more thereof as a primary material (A) is mixed with pulp or cotton fiber (B) as a binder in a certain ratio, to prepare a mixture (A+B). The mixture (A+B) is mixed with a mixture (C) of sodium bicarbonate, alum and glycerin in water to prepare a mixture (A+B+C). The mixture (A+B+C) is gelatinized by steam infusion or steaming at a temperature of 100~120° C. The gelatinized dough is put in a heating/compression molder and foamed to manufacture a container. At this time, the temperature of hot wires in the molder is preferably maintained at 130~220° C., and the heating and compression time is preferably adjusted to 1~2 minutes. After the container is separated from the molder, it is sprayed with a biodegradable coating agent or dipped in the biodegradable coating agent. Finally, the coated container is dried.

BEST MODES FOR CARRYING OUT THE INVENTION

Hereinafter, a process for manufacturing disposable containers according to the present invention is described in detail in following examples.

EXAMPLE 1

Flour powder was mixed with cotton yarn in a rate of 7:3 to prepare material 1. A solution in which 2 g alum and 2 g glyceline were dissolved in 70 g water was mixed and stirred with the material 1 to prepare dough. The dough was steamed in a steam pot at temperatures of 100~120° C. to prepare cake. The temperatures of mold heat wires were maintained at 130~220° C. The cake was mixed with 1 g sodium bicarbonate dissolved in 10 ml water, and then a certain amount of the cake was put in a mold. The mold was closed for 2-minute foam molding and drying. A biodegradable coating agent was sprayed inside and outside containers and dried. A sample of 1 cm wide and 3 cm long prepared from the dried container was tested for tensile strength and Tale 1 shows the result.

EXAMPLE 2

Flour powder was mixed with pulp in a rate of 7:3 to prepare material 1. A container was prepared by the same method as in the example 1, and a sample of 1 cm wide and 3 cm long prepared from the dried container was tested for tensile strength and Tale 1 shows the result.

EXAMPLE 3

Tapioca powder was mixed with cotton yarn in a rate of 7:3 to prepare material 1. A container was prepared by the same method as in the example 1, and a sample of 1 cm wide and 3 cm long prepared from the dried container was tested for tensile strength and Tale 1 shows the result.

EXAMPLE 4

Tapioca powder was mixed with pulp in a rate of 7:3 to prepare material 1. A container was prepared by the same method as in the example 1, and a sample of 1 cm wide and 3 cm long prepared from the dried container was tested for tensile strength and Tale 1 shows the result.

EXAMPLE 5

Funori was mixed with cotton yarn in a rate of 7:3 to prepare material 1. A container was prepared by the same method as in the example 1, and a sample of 1 cm wide and 3 cm long prepared from the dried container was tested for tensile strength and Tale 1 shows the result.

EXAMPLE 6

Funori was mixed with pulp in a rate of 7:3 to prepare material 1. A container was prepared by the same method as in the example 1, and a sample of 1 cm wide and 3 cm long prepared from the dried container was tested for tensile strength and Tale 1 shows the result.

EXAMPLE 7

Tapioca powder was mixed with pulp in a rate of 8:2 to prepare material 1. A container was prepared by the same method as in the example 1, and a sample of 1 cm wide and 3 cm long prepared from the dried container was tested for tensile strength and Tale 1 shows the result.

EXAMPLE 8

Tapioca powder was mixed with cotton yarn in a rate of 8:2 to prepare material 1. A container was prepared by the same method as in the example 1, and a sample of 1 cm wide and 3 cm long prepared from the dried container was tested for tensile strength and Tale 1 shows the result.

TABLE 1

| Tested Item | | Example No. | | | | | | | |
|---|---|---|---|---|---|---|---|---|---|
| | | 1 | 2 | 3 | 4 | 5 | 6 | 7 | 8 |
| Tensile Strength ($Kgf/15\ mm^2$) | Width | 10.8 | 9.44 | 8.04 | 8.42 | 7.87 | 7.87 | 5.12 | 6.20 |
| | Length | 14.4 | 11.2 | 11.0 | 11.3 | 10.9 | 10.9 | 5.66 | 7.74. |

The invention claimed is:

1. A method for manufacturing a disposable container comprising the steps of:
    mixing 30–70 parts by weight of at least one material (A) selected from the group consisting of flour, tapioca powder and funori as a primary material, with 30–70 parts by weight of one material (B) selected from the group consisting of pulp and cotton fiber as a binder, to prepare a mixture (A+B);
    mixing the mixture (A+B) with a mixture of (C) of 1–2 parts by weight of sodium bicarbonate, 1–2 parts by weight of alum and 1–2 parts by weight of glycerin in water, with respect to 100 part by weight of the mixture (A+B), to prepare a mixture (A+B+C);
    stirring, heating and gelatinizing the mixture (A+B+C);
    putting the gelatinized mixture in a molder, followed by foam molding under pressure to mold a container; and
    spraying the molded container with a coating agent or dipping it in the coating agent, and drying.
2. The method according to claim 1, wherein the mixing ratio of the material (A) to the material (B) is 7:3.
3. The method according to claim 1, wherein the gelatinization is carried out by steam infusion or steaming in a steam pot at a temperature of 100–120° C.
4. The method according to claim 1, wherein the mold has hot wires maintained at 130–220° C. for foam molding.
5. The method according to claim 4, wherein the foam molding time is 1–2 minutes.
6. A new method for manufacturing a disposable container comprising the steps of:
    mixing 70 parts by weight of flour (A) as a primary material with 30 parts by weight of cotton fiber (B), as a to binder, to prepare a mixture (A+B);
    mixing the mixture (A+B) with a mixture of (C) of 1–2 parts by weight of sodium bicarbonate, 1–2 parts by weight of alum and 1–2 parts by weight of glycerin in water, with respect to 100 part by weight of the mixture (A+B), to prepare a mixture (A+B+C);

stirring, heating and gelatinizing the mixture (A+B+C);

putting the gelatinized mixture in a molder, followed by foam molding under pressure to mold a container; and spraying the molded container with a coating agent or dipping it in the coating agent, and drying.

* * * * *